F. Landon
Mower.
Nº 30.655  Patented Nov. 13. 1860
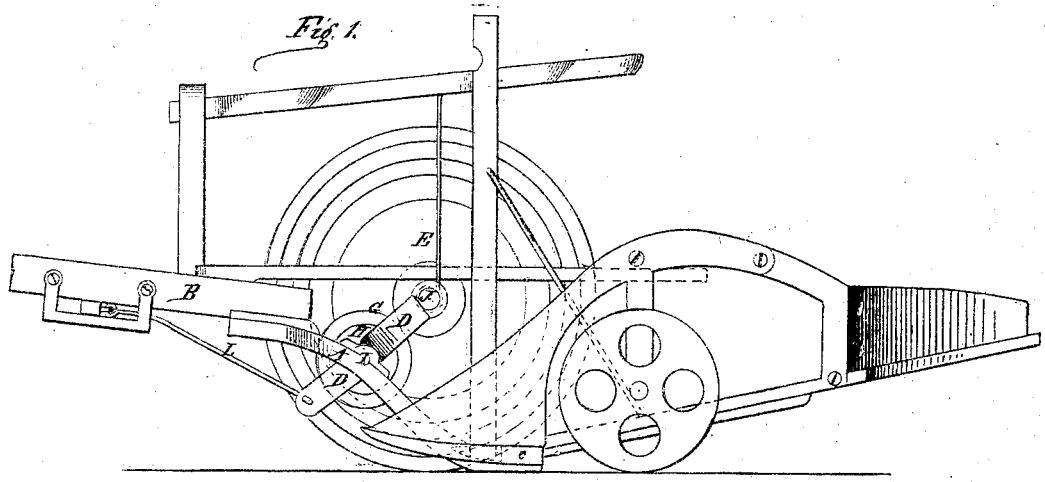
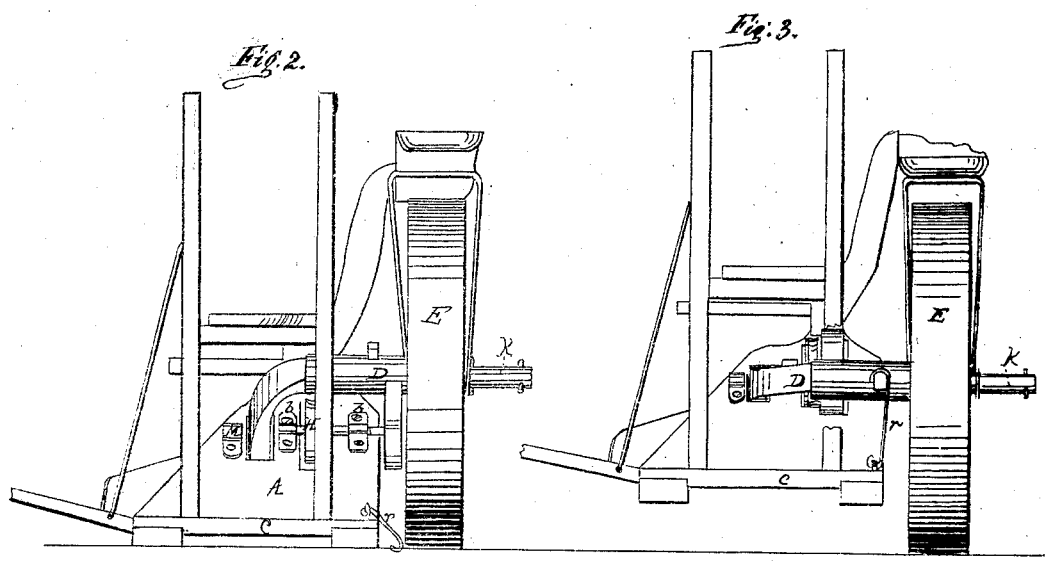
Witnesses  Frederick Landon

UNITED STATES PATENT OFFICE.

FREDERICK LANDON, OF BROCKPORT, NEW YORK, ASSIGNOR TO BYRON E. HUNTLEY, JOHN M. BOWMAN, AND CHARLES AND LA FAYETTE SILLIMAN.

IMPROVEMENT IN HARVESTERS.

Specification forming part of Letters Patent No. 30,655, dated November 13, 1860.

*To all whom it may concern:*

Be it known that I, FREDERICK LANDON, of Brockport, in Monroe county, and State of New York, have invented new and useful Improvements in Harvesters to be Used in Harvesting Small Grain and Grasses; and I do hereby declare that the following is a full and exact description thereof, reference being had to the accompanying drawings and the letters of reference thereon, in which—

Figure 1 is a side elevation of a machine in which are our improvements; and Fig. 2 is a rear view of the gear-works of a machine containing them, when they are arranged relatively to each other, when it is used as a mower; and Fig. 3 shows a rear view of a machine containing them when used as a reaper of grain.

The principle of my invention consists in providing appropriate mechanical means by which to secure a traction action to the drive wheel or wheels of a combined reaper and mower, especially when it is making abrupt descents in any undulations of the ground in its path, or in passing down hills of a greater or less degree of elevation, in fields where in the use of it it may be occasionally necessary to pass down such declivities, and where the drive-wheels of machines as generally constructed are liable to slip, rather than roll, and thereby cause an imperfect action or a temporary stoppage of the cutting apparatus while the machine is still in motion, to the loss or waste of grain or grass; and, also, such means as secures such an automatic adjustment of the finger-beam with respect to the periphery of the drive wheel or wheels as shall secure a close cut of grass when used as a mower.

That others skilled in the art may make and use my invention, I proceed to state its manner of construction and principle of operation.

The general structure of a machine containing my improvements is shown in Fig. 1.

The frame is of the shape represented in the model and drawings, Fig. 1, and is designated by the letter A, and may be made of any suitable material; but I prefer iron. B represents the tongue fastened to the top of the front end of the frame. E represents the drive-wheel, and is to be constructed with an internal spur-cog wheel to turn a pinion, (not shown in the drawings,) which turns on a transverse horizontal shaft that carries a bevel-wheel that is intended to move a bevel-pinion on a pitman-shaft, which is to vibrate the cutters, and a pulley-wheel to carry the cord to revolve the reel-shaft when the machine is used as a reaper; but the pitman-rod and the reel and its shaft, not being a part of this invention, are not represented or claimed herein.

The bevel-wheel is marked C and the pulley-wheel H in Fig. 1. The transverse shaft revolves in boxes on the frame marked *b b*.

D represents a traction yoke or lever of the shape represented in Fig. 2; but the shape of the yoke is not considered as absolutely essential to a proper performance of its functions, and it passes down through the frame on its inner or grain side and plays on that side on a gudgeon at M, which is fastened in a box on the frame at that place; and on the other side of the frame next the drive-wheel, when it plays on the transverse shaft before mentioned, the gudgeon and the transverse shaft, being in a line with suitable openings in the draft or traction yoke, serve as its fulcra, on which it will rock backward and forward with the undulations of the ground in the track of the drive-wheel. The traction-yoke extends below the frame for one-third, or thereabout, of its length, and to its lower ends is attached iron rods of suitable strength for the draft of the machine, which are brought together and carried up under the tongue B, where they are turned up in the form of a hook to receive the whiffletrees by which to move the machine, and they are kept in position by an iron bracket on each side of the tongue, as is shown in Fig. 1, and marked L. The axle of the drive-wheel passes through the rearward end of the traction-yoke, and is shown on the inner end of it at J and at its outer end at K.

The finger-bar G is made fast on the rear end of the frame, and the cutting apparatus may be of any approved form that is well known.

The traction-yoke has on its rear transverse end a projection like that shown in Figs. 2 and 3 at *p*, scalloped out near its inner end in such a manner as to receive and retain a hook at the end of a rod or chain, *r*, which at its other end is fastened by a swinging joint or hook to a staple in the frame, near the corner thereof next the drive-wheel. The object of this projection and rod is to adjust the cutter-bar to the machine with respect to the periphery of the drive-wheel, so as to adapt it to harvesting any kind of small grain, and Fig. 3 represents such an adjustment of it, and Fig. 2 represents such an adjustment of said parts to each other when the machine is used as a mower; but it will appear hereafter that this latter adjustment is automatically changeable to accord with any undulations of the ground in the path of the drive-wheel or machine.

It is obvious that a traction yoke or lever is equally applicable to machines having more than one drive-wheel, and to machines when the platform may not be of the kind represented in the model and drawings, and when it sustains different relations to other parts of the machine.

A seat for a driver, position for a raker, and posts for a reel may be provided, as represented; but, as they constitute no part of the invention herein, they are not particularly described. It may be remarked that the traction may properly be made of iron.

The operation of a machine containing my improvements is as follows: The axle of the drive-wheel resting in the rearward end of the traction yoke or lever, and the yoke or lever working on the gudgeon and the transverse pinion-shaft as its fixed fulcra, it results that the draft upon the rods L tends, by the fixed position of the fulcra, to draw the drive-wheel firmly to the earth by a power much greater than its natural gravitation; and this downward draft of the drive-wheel is increased when the machine is in use by the sum of the resistance presented to the cutting apparatus by the grain or grass being harvested; and it follows from this effect that as the drive-wheel is thus forced by the draft of the team firmly to the earth, it will, in making any descent to be met with in harvesting hay or grain, secure a rolling rather than a sliding draft of it; and as the drive-wheel is thus caused to revolve constantly in the use of the machine, a stoppage of the action of the cutting apparatus, with the attendant loss of grain or grass, is avoided; and a machine using this improvement may be profitably used on ground where, from the hilly nature of it, it would be impracticable to use machines not possessing it. As the draft of the team causes the drive-wheel to adhere much more firmly to the earth than it would by its natural gravitation, and thus causes the drive-wheel to roll rather than to slide in making any descent, it will readily be perceived—the rod which holds up the rear end of the frame when the machine is used for harvesting grain being removed—that by natural gravity the rear end of the frame will run on the surface of the ground, and the finger-beam being fastened onto the rear end of the frame, it follows that as the drive-wheel descends into any abrupt declivity the finger-bar will preserve its relative position to the periphery of the drive-wheel, causing a close cut of the grass and a constant action of the cutting apparatus. In the descent of the drive-wheel into any depressions in the ground in its path the finger-beam is automatically adjustable to the undulations of the ground by the forward and rearward action of the traction-lever, according to the undulations of the ground and within the line of the action of the traction-lever.

Having thus stated my invention, what I claim therein as new, and desire to secure by Letters Patent, is—

1. The traction yoke or lever D, the rods L, the pinion-shaft, and the gudgeon I, as fixed fulcra of the traction-lever, in combination with the axle of the drive-wheel, to secure a rolling or traction draft of the drive-wheel while making descents, and especially when it may be necessary, in the use of the machine, to pass down declivities of greater or lesser degrees, for the purpose specified, and substantially as described.

2. The traction-lever D, the rods L, the pinion-shaft, and gudgeon as fixed fulcra for the traction-lever, and the axle of the drive-wheel, in combination with the frame and finger-bar, to secure an automatic adjustment of the finger-bar to the periphery of the drive-wheel, for the purpose specified, substantially as described.

3. The combination of the traction-lever D, the rod r, and the frame A, to secure an adjustment of the finger-beam with respect to the periphery of the drive-wheel when the machine is used for harvesting grain, substantially as described.

In testimony of which invention I hereunto set my hand.

FREDK. LANDON.

Witnesses:
 AUSTIN HARMON,
 BYRON E. HUNTLEY.